United States Patent
Compain et al.

(10) Patent No.: US 9,594,732 B2
(45) Date of Patent: Mar. 14, 2017

(54) SELECTIVELY REPLACING DISPLAYED CONTENT ITEMS BASED ON USER INTERACTION

(71) Applicant: Google Inc., Mountain View, CA (US)

(72) Inventors: Adam J. Spanky Compain, San Francisco, CA (US); Mo-Gyung Rhim, Santa Monica, CA (US)

(73) Assignee: Google Inc., Mountain View, CA (US)

( * ) Notice: Subject to any disclaimer, the term of this patent is extended or adjusted under 35 U.S.C. 154(b) by 474 days.

(21) Appl. No.: 13/722,829

(22) Filed: Dec. 20, 2012

(65) Prior Publication Data

US 2014/0181634 A1  Jun. 26, 2014

(51) Int. Cl.
*G06F 17/24* (2006.01)
*G06F 17/22* (2006.01)

(52) U.S. Cl.
CPC .......... *G06F 17/2247* (2013.01); *G06F 17/24* (2013.01)

(58) Field of Classification Search
CPC .................................................. G06F 17/2247
USPC .......................................................... 715/234
See application file for complete search history.

(56) References Cited

U.S. PATENT DOCUMENTS

| | | | |
|---|---|---|---|
| 6,608,615 B1 * | 8/2003 | Martins | G06F 3/013 345/156 |
| 6,742,047 B1 | 5/2004 | Tso | |
| 7,941,525 B1 * | 5/2011 | Yavilevich | H04L 67/22 709/203 |
| 7,962,604 B1 * | 6/2011 | Morris | G06Q 30/02 705/14.4 |
| 2002/0078441 A1 | 6/2002 | Drake | |
| 2006/0212350 A1 | 9/2006 | Ellis et al. | |
| 2006/0256133 A1 * | 11/2006 | Rosenberg | G06Q 30/02 345/619 |

(Continued)

FOREIGN PATENT DOCUMENTS

| NL | WO 2012011011 A1 * | 1/2012 | ............ G06Q 30/02 |
|---|---|---|---|
| WO | WO0137119 A8 | 6/2002 | |

OTHER PUBLICATIONS

Alt, Florian, Alireza Sahami Shirazi, Albrecht Schmidt, and Julian Mennenöh. "Increasing the user's attention on the web: using implicit interaction based on gaze behavior to tailor content." In Proceedings of the 7th Nordic Conference on Human-Computer Interaction: Making Sense Through Design, pp. 544-553. ACM, 2012.*

(Continued)

*Primary Examiner* — Frank D Mills
(74) *Attorney, Agent, or Firm* — Fish & Richardson P.C.

(57) ABSTRACT

Systems, methods performed by data processing apparatus and computer storage media encoded with computer programs for receiving feedback from a client device at which a presentation page of content items is displayed, the received feedback relating to an affirmative act performed by the user, determining, based at least in part on the received feedback, whether the user is likely to perform a predetermined action relative to one or more of the content items, based on a result of the determining, selectively identifying one or more replacement content items and transmitting the one or more identified replacement content items to the client device for display in the presentation page in place of one or more of the plurality of content items.

38 Claims, 6 Drawing Sheets

(56) References Cited

U.S. PATENT DOCUMENTS

| | | | |
|---|---|---|---|
| 2008/0071881 A1* | 3/2008 | Kronlund | G06Q 30/0258 709/217 |
| 2008/0155590 A1 | 6/2008 | Soukup | |
| 2009/0287566 A1* | 11/2009 | McAfee | G06Q 30/02 705/14.41 |
| 2010/0095208 A1* | 4/2010 | White et al. | 715/704 |
| 2010/0114689 A1 | 5/2010 | Kennedy et al. | |
| 2010/0114720 A1* | 5/2010 | Jones | G06Q 30/0251 705/14.73 |
| 2010/0275125 A1 | 10/2010 | Elazary | |
| 2010/0318418 A1 | 12/2010 | Wertheimer et al. | |
| 2011/0125594 A1* | 5/2011 | Brown et al. | 705/14.73 |
| 2011/0258032 A1* | 10/2011 | Vadlamani | G06F 17/30699 705/14.42 |
| 2011/0258049 A1 | 10/2011 | Ramer et al. | |
| 2012/0158502 A1* | 6/2012 | Chung | G06Q 30/0269 705/14.53 |
| 2012/0158519 A1* | 6/2012 | Edwards | 705/14.68 |
| 2013/0091415 A1* | 4/2013 | Stilling et al. | 715/234 |
| 2013/0117102 A1* | 5/2013 | Barbieri | G06Q 30/0244 705/14.43 |
| 2013/0211923 A1* | 8/2013 | Yuill | G06Q 30/0276 705/14.72 |
| 2013/0211924 A1* | 8/2013 | Yuill | G06Q 30/0277 705/14.72 |
| 2013/0238612 A1* | 9/2013 | Tsongas | G06F 17/30867 707/723 |
| 2014/0129325 A1* | 5/2014 | Zinger et al. | 705/14.46 |
| 2014/0249926 A1* | 9/2014 | Wallace | G06Q 30/0277 705/14.64 |

OTHER PUBLICATIONS

Brittany Darwell, "Facebook begins rotating ads on static pages if users don't interact" http://www.insidefacebook.com/2012/07/13/facebook-begins-rotating-ads-on-static-pages-if-users-dont-interact/, Jul. 13, 2012.

Authorized Officer Ji Myong Nho, Notification of Transmittal of International Search Report and Written Opinion of the International Searching Authority, International Application No. PCT/US2013/077126, mailed Apr. 9, 2014, 13 pages.

International Preliminary Report on Patentability in International Application No. PCT/US2013/077126, mailed Jul. 2, 2015, 10 pages.

* cited by examiner

SELECTIVELY REPLACING DISPLAYED CONTENT ITEMS BASED ON USER INTERACTION

BACKGROUND

This specification relates to providing digital content items (e.g., advertisements and/or other types of content) to users in a display environment. Examples of display environments include electronic publications such as webpages accessible via a web browser application executing on a computer system that has connectivity with the Internet, on a point-of-sale kiosk or, more generally, on any appropriate display in essentially any suitable context or environment.

Publishers (e.g., web site publishers) may include content such as content sponsoring in their respective publications to help financially support their operations. Some publishers do not maintain a content sponsoring (e.g., advertising) infrastructure, and thus depend on third party content sponsor serving companies to recruit content sponsors and to serve content items to the publishers' sites. Third party content sponsor serving companies can, depending on various factors, control which content items are displayed to which users and under what circumstances. For example, a content sponsor serving company can provide directed content items, such as advertisements, to certain groups of users.

SUMMARY

In general, one aspect of the subject matter described in this specification may be embodied in systems, methods performed by data processing apparatus and non-transitory computer storage media encoded with computer programs that include the actions of receiving feedback from a client device at which a presentation page of content items is displayed, the received feedback relating to an affirmative act performed by the user, determining, based at least in part on the received feedback, whether the user is likely to perform a predetermined action relative to one or more of the content items, based on a result of the determining, selectively identifying one or more replacement content items and transmitting the one or more identified replacement content items to the client device for display in the presentation page in place of one or more of the plurality of content items.

The presentation page may be a dynamic webpage and at least one of the content items may be an independently replaceable advertisement. The affirmative act performed by the user may involve an action from which disinterest in one or more content items can reasonably be inferred. Determining whether the user is likely to perform the predetermined action may involve inferring whether the user is likely to perform an action indicating interest in one or more content items. Inferring whether the user is likely to perform an action indicating interest in one or more content items may involve deciding whether the user is likely to click on a link associated with a content item.

Determining whether the user is likely to perform the predetermined action may be performed by a logic engine applying pre-defined rules. One or more of the rules may be based on factors including one or more a nature of the affirmative act performed by the user, a duration of time spent on the presentation page by the user, demographics of the user, browsing history of the user, a type of the client device, a geographic location of the client device, and one or more other external factors. The pre-defined rules may be defined by one or more of a publisher of the presentation page, a content sponsor of at least one content item, and the user. Selectively identifying one or more replacement content items may involve applying one or more of the pre-defined rules.

Receiving feedback from the client device may be performed in real time relative to the user's affirmative act.

Another aspect of the subject matter described in this specification may be embodied in systems, methods performed by data processing apparatus and non-transitory computer storage media encoded with computer programs that include the actions of displaying to a user a presentation page of content items, detecting an affirmative act performed by the user from which an inference can be made relating to one or more of the displayed content items, transmitting feedback corresponding to the detected affirmative user action to a server system, receiving from the server system one or more replacement content items that were selected based at least in part on the transmitted feedback, and updating the displayed presentation page to replace one or more of the displayed content items with the received one or more replacement content items.

The affirmative act performed by the user may involve causing a focus point on a client device displaying the presentation page to pass over a content item without also performing an action indicating interest in the content item. The focus point may be a cursor displayed on the client device, the content item may be a clickable link, and the action indicating interest may involve clicking on the clickable link. The focus point may be a detected eye-point of the user on the client device display.

The affirmative act performed by the user may involve changing a display configuration of the presentation page to cause one or more content items to be relocated to a position of lesser prominence in the presentation page. The affirmative act performed by the user may involve changing a display configuration of the presentation page to cause one or more content items to be obscured in whole or in part. Changing the display configuration may involve one or both of resizing the presentation page and scrolling the presentation page.

Transmitting feedback may be facilitated in real time via a cookie residing at the client device. Updating the displayed presentation page may be performed without refreshing portions of presentation page that remain unchanged. Updating the displayed presentation page may involve independently replacing the one or more displayed content items without affecting other portions of the presentation page.

The affirmative act performed by the user may involve one or more of performing a search, interacting with a content item on the presentation page, and providing alphanumeric input.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In general, the subject matter of this specification relates to selectively replacing displayed content items (e.g., advertisements displayed in a webpage) based on user interaction or behavior (e.g., a user action detected—with the user's knowledge and consent—relative to one or more of the displayed content items). Online advertisers and advertising platforms (e.g., Google's AdWords) seek to show a user a successful advertisement (or "ad") at the right time, where success typically is regarded as occurring when the user responds to the ad (e.g., clicks on it when the ad is displayed as a link in a webpage). For online advertising, a measurement of ad success is "click-through rate," which corresponds to the percentage of users who click on a particular ad upon having it presented to them. Because webpages and other presentation displays are finite in extent, however, only a limited quantity of ads can be presented at one time on any given presentation page. As a result, a user visiting a webpage for a certain amount of time (e.g., 2 minutes) will be exposed to only a handful of ads (e.g., 5-7) during that webpage visit, and not infrequently, the displayed ads are not relevant or otherwise of interest to the user and thus are not clicked on or otherwise responded to by the user.

The present inventors recognized that increasing the opportunity to show more relevant advertisements to users (e.g., by presenting a greater quantity of advertisements on a presentation page within the duration of the user's visit)—ideally without having to refresh the page's other content and without increasing the amount of space on the page that the inventory occupies—would increase the likelihood that the user would respond to one or more of the ads. To accomplish this, for example, an advertisement presented to a user viewing a webpage can be refreshed with a new, replacement advertisement when it is determined (e.g., based on user acts or other behavior) that the user has not, and likely will not, respond to the advertisement currently presented to the user. Consequently, advertisement inventory (i.e., the space available on a page for presentation of advertisements) tends to be better utilized thereby benefitting users, publishers, advertisers and/or content servers. The subject matter described here operates in a context in which the user is aware of, and has consented to, the use of user interaction feedback to facilitate selective replacement of content items. Various alternatives, options and implementations are possible as described herein.

Example Operating Environment

Figure 1:
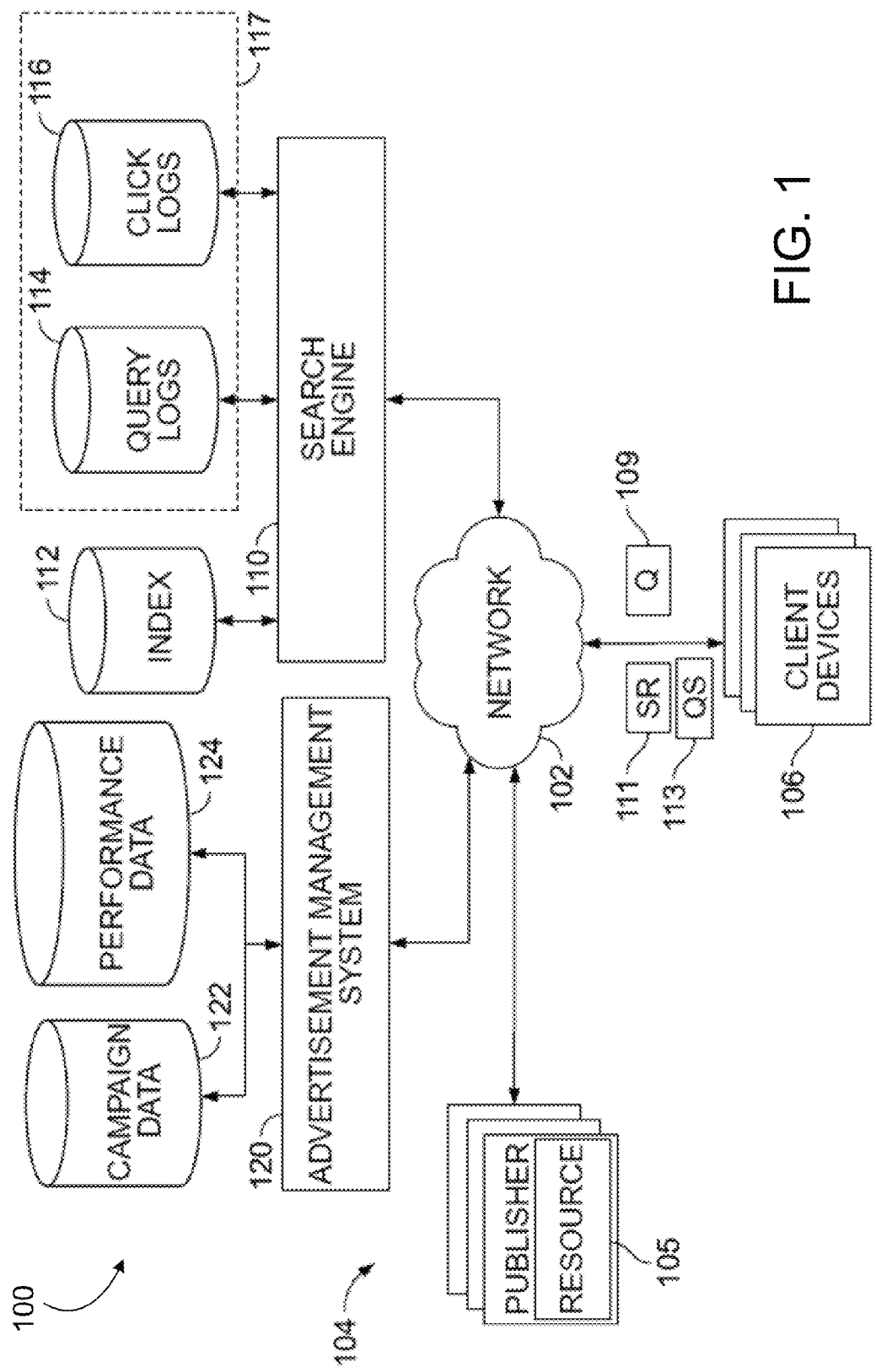
FIG. 1 is a block diagram of an example operating environment.

FIG. 1 is a block diagram of an example operating environment 100 in which various aspects of the subject matter described here may be implemented. A computer network 102, such as a local area network (LAN), wide area network (WAN), the Internet, or a combination thereof, connects publisher web sites 104, user devices 106, and the search engine 110, and an content item management system 120. The online environment 100 may include many thousands of publisher web sites 104 and user devices 106.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a content publisher, which is an entity that controls, manages and/or owns the website 104.

A resource is any data that can be provided by the publisher 104 over the network 102 and that is associated with a resource address. Resources include HTML pages, word processing documents, and portable document format (PDF) documents, images, video, and feed sources, to name just a few. The resources can include content, such as words, phrases, pictures, and so on, and may include embedded information (such as meta information and hyperlinks) and/or embedded instructions (such as scripts).

A user device 106 is an electronic device that is under the control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102. The web browser can enable a user to display and interact with text, images, videos, music and other information typically located on a web page at a website on the world wide web or a local area network.

To facilitate searching of these resources 105, the search engine 110 identifies the resources by crawling the publisher web sites 104 and indexing the resources provided by the publisher web sites 104. The resources are and the index data are stored in an index 112.

The user devices 106 submit search queries to the search engine 110. The search queries are submitted in the form of a search request that includes the search request and, optionally, a unique identifier that identifies the user device 106 that submits the request. The unique identifier can be data from a cookie stored at the user device, or a user account identifier if the user maintains an account with the search engine 110, or some other identifier that identifies the user device 106 or the user using the user device.

In response to the search request, the search engine 110 uses the index 112 to identify resources that are relevant to the queries. The search engine 110 identifies the resources in the form of search results and returns the search results to the user devices 106 in search results page resource. A search result is data generated by the search engine 110 that identifies a resource that satisfies a particular search query, and includes a resource locator for the resource. An example search result can include a web page title, a snippet of text extracted from the web page, and the URL of the web page.

The search results are ranked based on scores related to the resources resulting from the search, such as information retrieval ("IR") scores, and optionally a separate ranking of each resource relative to other resources (e.g., an authority score). The search results are ordered according to these scores and provided to the user device according to the order.

The user devices 106 receive the search results pages and render the pages for presentation to users. In response to the user selecting a search result at a user device 106, the user device 106 requests the resource corresponding to the resource locator included in the selected search result. The publisher of the web site 104 hosting the resource receives the request for the resource from the user device 106 and provides the resource to the requesting user device 106.

In some implementations, the queries submitted from user devices 106 are stored in query logs 114. Click data for the queries and the web pages referenced by the search results are stored in click logs 116. The query logs 114 and the click logs 116 define search history data 117 that include data from and related to previous search requests associated with unique identifiers. The click logs define actions taken responsive to search results provided by the search engine 110. The query logs 114 and click logs 116 can be used to map queries submitted by the user devices to web pages that were in the search results and the actions taken by users (i.e., that data are associated with the identifiers from the search requests so that a search history for each identifier can be accessed). The click logs 116 and query logs 114 can thus be used by the search engine to determine the sequence of queries submitted by the user devices, the actions taken in response to the queries, and how often the queries are submitted.

The content item management system 120 facilitates the provisioning of content items with the resources 105. A variety of appropriate content items can be provided, and one example content item is an advertisement. In the case of advertisements, content item management system 120 allows advertiser to define selection rules that take into account attributes of the particular user to provide relevant advertisements for the users. Example selection rules include keyword selection, in which advertisers provide bids for keywords that are present in either search queries or webpage content. Advertisements that are associated with keywords having bids that result in an advertisement slot being awarded in response to an auction are selected for displaying in the advertisement slots.

When a user of a user device 106 selects an advertisement, the user device 106 generates a request for a landing page of the advertisement, which is typically a webpage of the advertiser. For example, the publishers 104 may include advertisers, each having hosting respective web pages, some of which are landing pages for the advertisements of the advertisers.

These directed content items can be provided for many different resources, such as the resources 105 of the publishers 104, and on a search results page resource. For example, a resource 105 from a publisher 104 includes instructions that cause the user device to request advertisements from the content item management system 120. The request includes a publisher identifier and, optionally, keyword identifiers related to the content of the resource 105. The content item management system 120, in turn, provides advertisements to the particular user device.

With respect to a search results page, the user device renders the search results page and sends a request to the content item management system 120, along with one or more keywords related to the query that the user provide to the search engine 110. The content item management system 120, in turn, provides directed content items to the particular user device.

In the case of advertisements, the content item management system 120 includes a data storage system that stores campaign data 122 and performance data 124. The campaign data 122 stores advertisements, selection information, and budgeting information for advertisers. The performance data 124 stores data indicating the performance of the advertisements that are served. Such performance data can include, for example, click through rates for advertisements, the number of impressions for advertisements, and the number of conversions for advertisements. Other performance data can also be stored.

The campaign data 122 and the performance data 124 are used as input parameters to an advertisement auction. In particular, the content item management system 120, in response to each request for advertisements, conducts an auction to select advertisements that are provided in response to the request. The advertisements are ranked according to a score that, in some implementations, is proportional to a value based on an advertisement bid and one or more parameters specified in the performance data 124. The highest ranked advertisements resulting from the auction are selected and provided to the requesting user device.

Selectively Replacing Displayed Content Items

Figure 2:
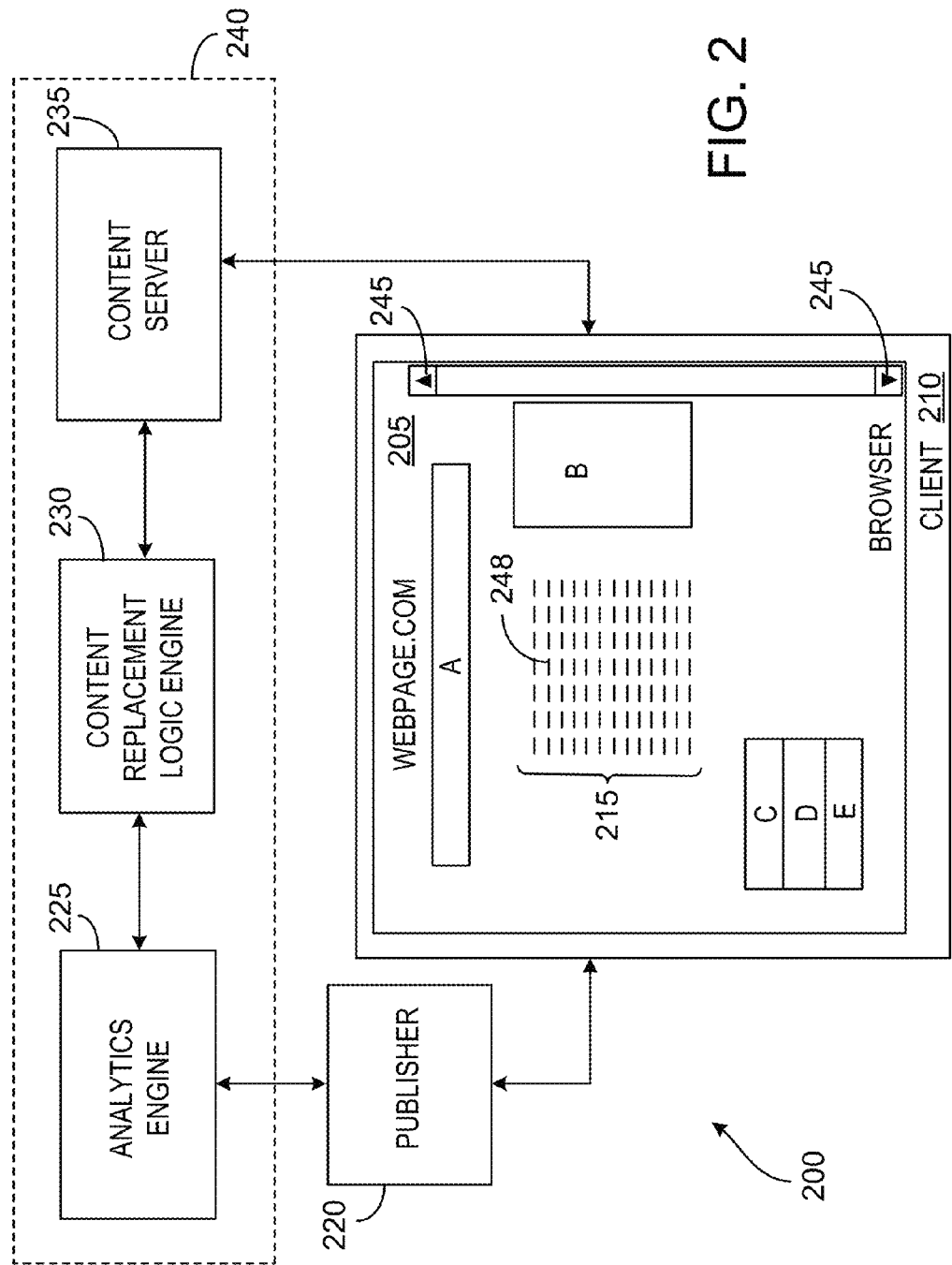
FIG. 2 is a block diagram of an example environment for selectively replacing content items in a presentation page displayed at a client device.

FIG. 2 is a block diagram of an example environment 200 for selectively replacing content items in a presentation page 205 displayed at a client device 210, such as a personal computer, a tablet computer, or a smart phone or other mobile device. As shown therein, the presentation page 205, e.g., a webpage rendered by a browser application executing on the client device 210, includes not only content provided by the presentation page's publisher 220, but also includes an inventory of content spaces (labeled A, B, C, D, E in FIG. 2) in which ads or other content items can be displayed. Typically, the ads to be displayed in the spaces A-E are received from a content server 225 (e.g., an advertising server) and are rendered by the browser application in the respective spaces A-E.

In the example of FIG. 2, the content spaces A-E are individually and selectively replaceable, e.g., in response to detected user interactions with the presentation page, and without the need to refresh or change the presentation page's other content. As a result, a greater quantity and/or variety of ads or other content items can be displayed to the user while the user is viewing the presentation page. To facilitate this functionality, the presentation page Publisher 220 analyzes actions performed at the client device 210 (e.g., by placing a cookie with the browser executing on the client device 210) relative to the presentation page 205, and relays information about the performed actions to the Analytics Engine 225 for storage and/or processing. Using the information stored in the analytics engine 223, the content replacement logic engine 230 (or "logic engine" for short) analyzes the stored information, and applies a set of predetermined rules, to determine whether one or more items among the information supports a conclusion, or at least a reasonable inference, that the user viewing presentation page 205 likely is not interested in one or more of the content items displayed in spaces A-E.

Upon determining that the user likely is disinterested in an advertisement or other content item displayed in a space A-E, using the logic engine 230 in conjunction content server 235, a suitable replacement content item is determined, which replacement in turn will be transmitted to the browser application communicating on the client device 210 and be used to replace an appropriate one of the content items currently presented in Spaces A-E. Ideally, this replacement operation is facilitated using a dynamic webpage technology such as Ajax or iFrames so that replacement of the content item in question may be performed independently and separately from (e.g., without having to refresh or change) the other content on the presentation page 205.

In the example environment of FIG. 2 the analytics engine 225, content replacement logic engine 230 and content server 235 are shown as being under the control of a single entity at a central location 240, although other configurations are possible. For example, one or more of the analytics engine 225, content replacement logic engine 230 and content server 235 may be distributed among different locations and/or may be under the control of different but cooperating entities.

A conclusion or inference by the Logic Engine 230 that the user viewing presentation page 205 is not interested in any given content item in spaces A-E also may support a conclusion that the user will not undertake a predetermined action relative to the content item under consideration (e.g., click on a link associated with the content item, thereby redirecting the user's browser to a presentation page corresponding to subject matter of the content item—for example, an advertiser's webpage at which the user can purchase and/or learn about a product or service advertised by the content item).

Figure 3:
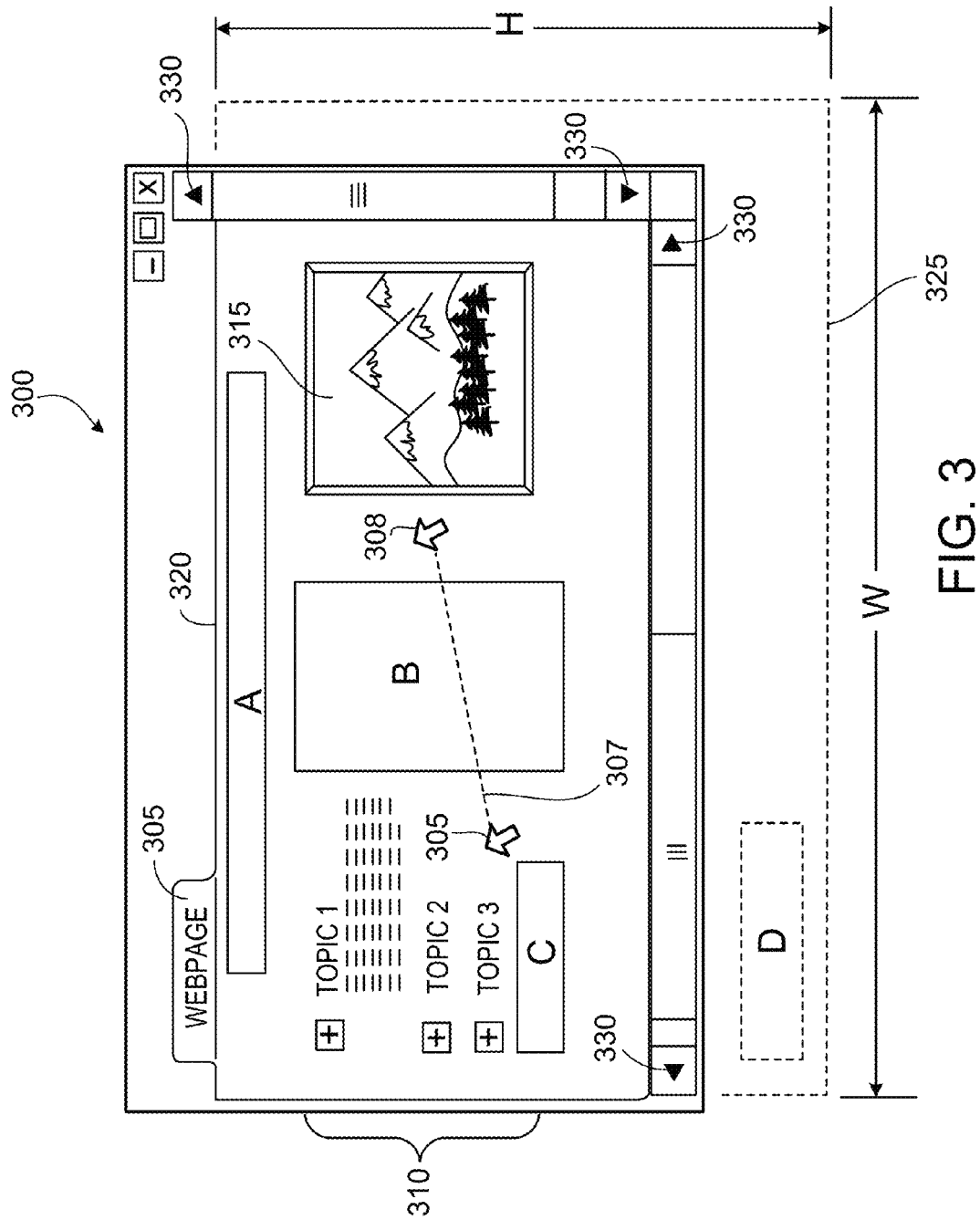
FIG. 3 is a representation of a dynamic presentation page having independently and selectively changeable content items.

FIG. 3 is a representation of a browser window 300 displaying a dynamic presentation page 305, such as a webpage, having independently and selectively changeable content item spaces (labeled A, B, C, and D)—for example, advertisements that may be individually replaced upon detecting user disinterest. As shown, the webpage 305 to be displayed has a height H and a width W, which is larger than the current dimensions of browser window 300, resulting in a hidden portion 325 of the webpage 305 that is not currently visible to the user. As a result, in the state shown, any ad or other content item designated for display in space D is not visible to the user, although the content item displayed in space D could be brought into the visible portion of the browser window 300 if, for example, the user changed a configuration of by displayed presentation page, e.g., either by resizing the browser window and/or using the scrolling controls 330 to scroll currently invisible portions of the webpage 305 into view.

The webpage 305 also includes content items specified by the webpage's publisher, for example, the three topics 310 and image 315. Because the webpage 305 is dynamic, the publisher specified content 310 and/or 315 may also be dynamic, meaning that they can change appearance and/or size without changing or having to refresh other content on the webpage 305. For example, each of the three topics 310 may be expandable to increase in visual size and thereby display additional information, which typically results in changing the relative arrangement and organization of content elements that are displayed on the webpage 305. Similarly, image 315 may be clickable by the user to alternately increase or decrease in size, thereby taking up more or less of the visible portion of the webpage 305 and potentially causing rearrangement, and/or obscuration, of other content elements on the page.

As noted above, affirmative acts by the user (including, e.g., proactive actions undertaken by the user and not merely inaction) relative to the webpage 305 may be used to determine or infer that the user is disinterested in a particular content item, in which case the content item of disinterest will be replaced with a new content item. In general, essentially any appropriate affirmative act by the user can be analyzed and used, at least in part, in making the determination or inference that the user is disinterested in a particular content item.

For example, assume that an advertisement for stainless steel widgets is currently being displayed in space B of webpage 305. Assume further that the user does not click on the widget ad in Space B but rather manipulates a pointing device (e.g., mouse, stylus, finger) to cause a focus point such as a cursor (or, in cursorless devices, an indicated position on the display) to move from a first position 305, along path 307, to a second position 308 and does so without clicking on the widget ad displayed in space B (and/or performing any other detectable act indicating interest in the widget ad). That affirmative act—namely, that the user has "moused over" the widget ad in space B—may be used by the logic engine 230 (potentially along with other information) to determine or infer that the user is disinterested in the stainless steel widget ad displayed in space B, the logic being that likely the user's gaze followed movement of the cursor along path 307, and thus necessarily saw the widget ad in space B, but because the user did not click on the widget ad, the user may be deemed to be disinterested in that ad in particular and/or in the category of the ad (e.g., widgets) in general. Consequently, not only could a determination be made, using the logic engine 230, that the ad currently displayed in space B should be replaced with a new ad—one in which hopefully the user may be interested—but also that the replacement ad (and potentially no other replacement ads to be served in the future) should relate to subject matter other than widgets.

Alternatively, depending on context and circumstances, an affirmative act by a user of "mousing over" a content item without clicking on it (or taking other predetermined action) may indicate a level of interest in the content item. In that case, a determination may be made either not to replace the content item in question or replace it with a complementary content item, e.g., one related to the same general subject matter or topic.

Other and/or additional affirmative acts by the user from which disinterest in a particular content item may be inferred are possible. For example, if the client device 210 employs technology that permits eye following and/or gaze following, and assuming that the user is aware that such technology is in use and has affirmatively consented to its use, an affirmative user act from which disinterest may be inferred may include a determination that a focus point corresponding to the user's eye-point and/or gaze moved across, and/or potentially temporarily lingered on for a predetermined duration, a particular content item but did so without taking any action indicating interest in that item (e.g., clicking on it).

As a further example, the user may change a configuration of the displayed presentation page, e.g., by resizing and/or scrolling the browser window 300 such that content items in one or more of the spaces A-D are obscured in whole or part, and/or caused to be relocated in the browser window to a position of lesser prominence (e.g., positions nearer the periphery of the browser window may be considered lesser prominent that positions nearer the center of the display) thereby supporting a reasonable inference that the user is disinterested in the content item or items that have been partially or wholly obscured. Similarly, user interaction with the publisher specified content 310 and/or 315 may serve as affirmative acts by the user from which disinterest in a particular content item may be determined or inferred. For example, if in the example of FIG. 3, the user expands Topic 3 (the bottommost topic at 310), the displayed information associate with Topic 3 may increase in size thereby effectively moving space C downward on the webpage 305 and/or causing space C to be partially obscured, thereby providing support for an inference that the user is disinterested in the ad currently displayed in space C.

As an additional example, an affirmative act by a user of performing a search may be used by the logic engine as feedback in deciding whether and/or how to replace a currently displayed content item. For example, while remaining on a publisher's presentation page, a user of a browser application could perform a search (e.g., using an embedded search box to search within that page or by using control-F functionality, such as provided by many applications, or potentially by opening up another browser tab and searching on a search engine in another window), and the resulting search terms (and/or the search results) could be used by the logic engine in making decisions about replacing one or more content items displayed on the presentation page.

More generally, any or all of the following may be used by the logic engine as feedback signals—but only with the user's knowledge and express permission—in making decisions about replacing one or more content items displayed on the presentation page:

- adjusting the presentation page (e.g., scroll or resize window) so that content is in or out of view
- adjusting the presentation page (e.g., scroll or resize window) so that content has changed position on the page (e.g., the user scrolled up/down on the and the content item in question is still visible on the page but at a higher/lower position)
- passage of time (e.g. the content item in question has been visible for a predetermined duration of time (e.g., 30 seconds) without any action indicating interest in the content item
- cursor interaction or inaction (mouse-over) on the specific content that is under consideration for replacement
- cursor or other activity (e.g., watching a video) on other parts of the page—that is, not focusing on the content item in question but rather on other content on the page
- additional navigation within the browser (even in other tabs, which is traceable by cookie)
- Search behavior (e.g., intra-page or outside the page)
- user-added content, such as alphanumeric input (e.g., writing a review or comment on an article), the context of which could influence what content items are replaced and/or displayed
- orientation of the user device on which the page is being presented (e.g., screen orientation such as determined by an accelerometer)
- a user's exterior factors such as music playing in the background
- geolocation (e.g., either stationary or dynamic if the user is in transit)

In addition to acting as cues that one or more content items in a dynamic presentation page are to be replaced due to inferred user disinterest, affirmative user acts may additionally, or alternatively, serve as a basis of inference about the type of content item with which the current item should be replaced. For example, in the example of FIG. 3, assume that the user affirmatively clicks on image 315, thereby causing it to enlarge per the webpage publisher's specifications. From that affirmative act—specifically, enlarging the image 315 thereby expressing interest in the image—a reasonable inference may be made that the user is inclined towards visual or graphic (as opposed to textual) content. Consequently, this inference may be used subsequently by the logic engine as a weighting factor in deciding what type of replacement content items to cause to be served to the client device 210. Similarly, if for example the user interacts with one of the three topics 310, a reasonable inference can be made that a subsequent replacement content item should be complementary to the selected topic because such as complementary content item is likely to be of interest to the user.

Figure 4A:
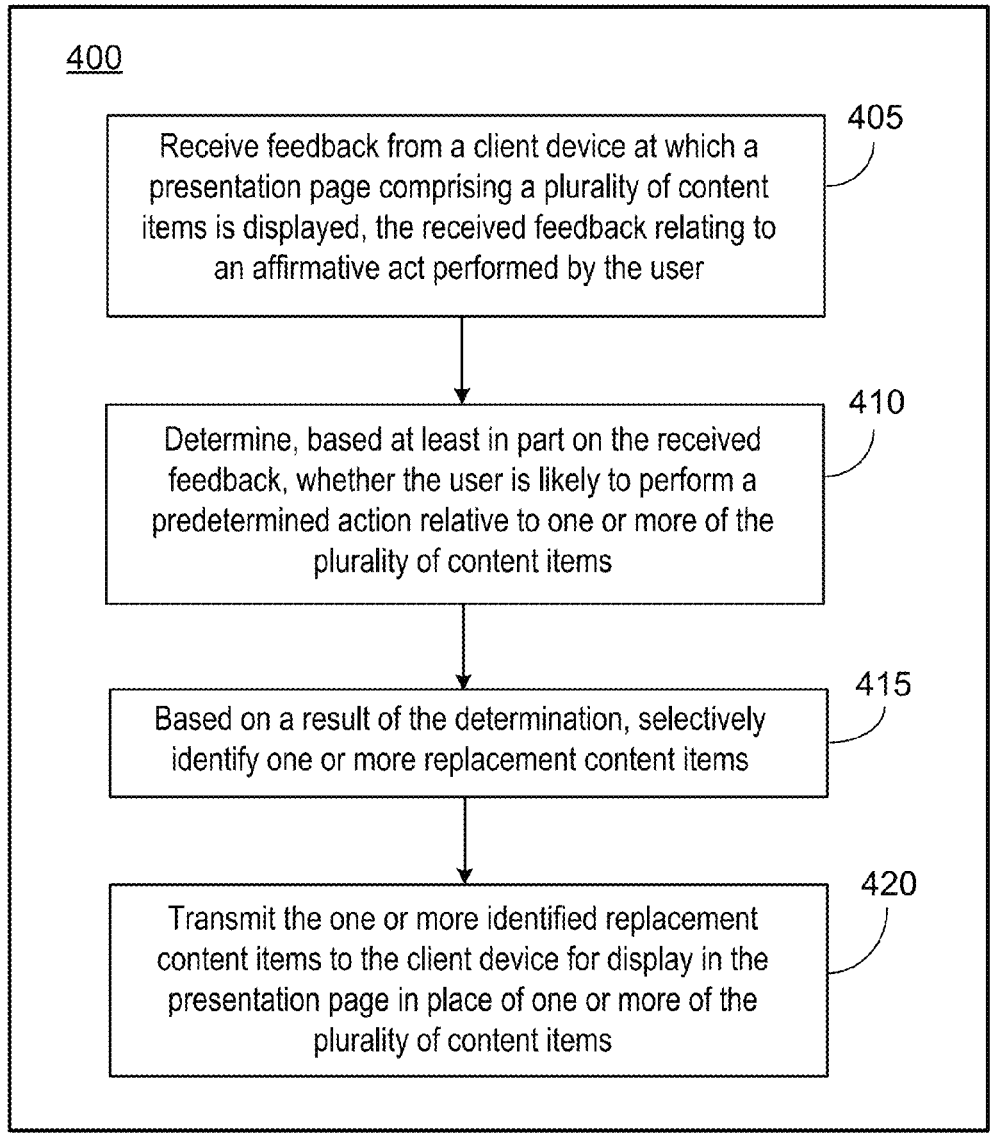
FIG. 4A is a flowchart of an example process performed by a server system to facilitate selectively replacing content items in a presentation page displayed at a client device.

FIG. 4A is a flowchart of an example process 400 performed by a server system to facilitate selectively replacing—in response to inferring likely disinterest—content items in a presentation page displayed at a client device (e.g., a webpage displayed in a browser window executing on the client device). The process 400 operates in a context in which the user is aware of, and has consented to, the use of user interaction feedback to facilitate selective replacement of content items. At 405, the process 400 receives feedback from a client device that displays a presentation page composed of multiple content items (e.g., clickable advertisements), one or more of which are selectively and independently replaceable. The received feedback relates, e.g., to an affirmative act performed by the user such as moving a cursor past a displayed content item without also performing a predetermined action such as clicking on the displayed content item, changing a configuration of the display (e.g., resizing or scrolling a display window) in a manner that expresses disinterest in one or more of the content items, or the like. In an implementation, the feedback from the client device is collected by a system controlled by a publisher of the presentation page and relayed to an analytics engine for analysis and storage.

At 410, the process 400 determines, based at least in part on the received feedback but potentially also on other information, whether the user is likely to perform a predetermined action relative to one or more of the content items displayed in the presentation page. For example, assuming that the content item is a clickable ad and the predetermined action is clicking on the ad (thereby expressing interest in the ad), the process 400 may infer from the received feedback relating to affirmative user acts that the user is unlikely to click on the displayed ad. In an implementation, this determination may be made by the content replacement logic engine, which communicates with the analytics engine storing the received feedback relating to the affirmative user acts. The logic engine may use a set of predetermine rules to decide when a content item is to be replaced and potentially also the nature or type of content item that should serve as the replacement. The logic engine's rules may be based on any or all of several different factors such as the quantity and/or nature of the affirmative acts (e.g., the affirmative act of scrolling the browser window to obscure the content item may be accorded a higher weight than, e.g., the affirmative act of mousing over the content window without clicking on it), the duration of time spent on the presentation page, the user's demographics, the user's browsing history, the type of client device (e.g., desktop, table or smartphone), the type of browser application, the device's geographic location, other external factors (e.g., time of day) or the like.

At 415, based on a result of the determination in 410, the process selectively identifies one or more replacement content items. For example, if the process 400 determines at 410 that replacement of a content item in the presentation page is appropriate or otherwise warranted, then the process 400 identifies a specific available content item to serve as the replacement. In an implementation, in cooperation with the content item server, the logic engine applies one or more rules relating to the replacement selection and suitability to identify a specific replacement content item. The rules applied by the logic engine potentially may be specified and/or modified by one or more various entities including the presentation page publisher, the advertiser, and/or the user.

Additionally, or alternatively, the rules applied by the logic engine may arbitrarily complex, taking into multiple different factors. For example, an advertiser may specify a replacement rule to the effect of "if the user performs an affirmative act such that ad X is caused to obscured from view in whole or part (e.g., either through resizing or scrolling of the browser window) within 4 seconds of initial display within the webpage, and the user in in the Southern United States, then display ad Y." As another example, a logic engine rule may specify that "if a displayed content item relates to category Z (e.g., finance, sports, travel, etc.), and if the user performs the affirmative act of moving the cursor over the content item without also performing a predetermined action indicating interest in the content item (e.g., clicking on it), then replace the content item with another content item take from a category other than Z." Additionally, the latter example rule optionally may also specify that no replacement ads in category Z are to be served for a specified duration of time (e.g., the next 5 minutes).

Next, after one or more replacement content items have been identified in 415, at 420 the process 400 transmits the one or more identified replacement content items to the client device for display in the presentation page in place of one or more of the presently displayed content items. Where the presentation page is dynamic (e.g., a dynamic webpage), technologies such as Ajax or iFrames can be used to replace each content item independently and selectively, and without refreshing, changing or otherwise disrupting other content on the presentation page.

Typically, advertisers are charged certain rates for presentation of their ads on webpages based on factors such as Click-Through-Rates ("CTRs"), cost per thousand impressions ("CPM"), and/or conversion rates. The advertising rates to be charged for replacement advertisements (or, more generally, replacement content items) can differ from the rates charged for ads displayed in a webpage in the first instance. For example, depending on the circumstances, a replacement ad rate may be either lesser or greater than the rate charged for an ad displayed along with the original rendering of the webpage.

Figure 4B:
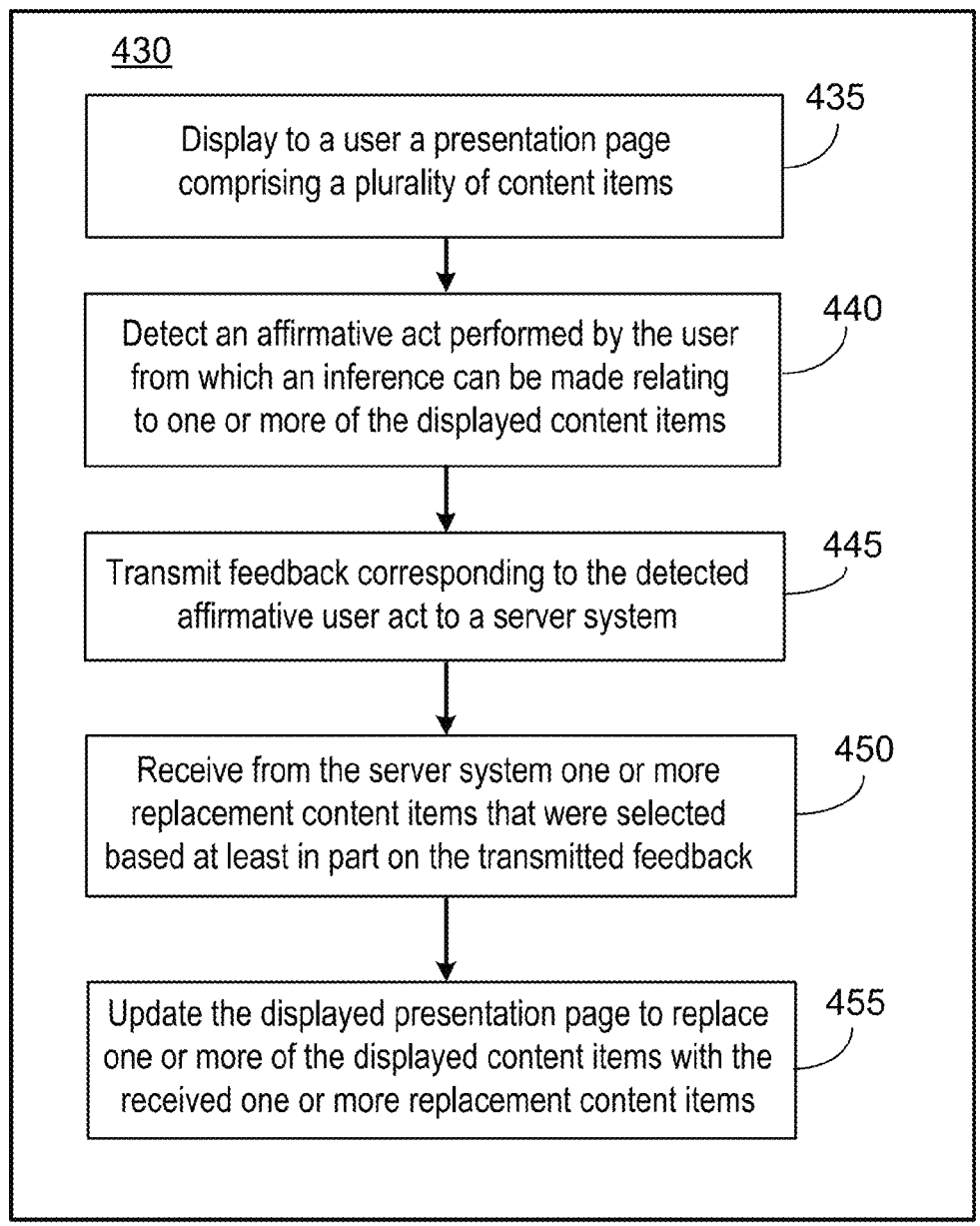
FIG. 4B is a flowchart of an example process performed by a client device to facilitate selectively replacing content items in a presentation page displayed at the client device.

FIG. 4B is a flowchart of an example process 430 performed by a client device to facilitate selectively replacing content items in a presentation page displayed at a client device. The process 430 operates in a context in which the user is aware of, and has consented to, the use of user interaction feedback to facilitate selective replacement of content items. At 435, a presentation page comprising a plurality of content items (e.g., a dynamic webpage composed of content including one or more ads that are individually and independently replaceable) is displayed to a user.

At 440, the process 430 detects an affirmative act performed by the user from which an inference can be made relating to one or more of the displayed content items. For example, the process 430 may detect that the user has moused over an ad without clicking on it, or has resized or scrolled a browser to obscure partially or wholly one or more ads, in which case a reasonable inference can be made that the user is disinterested in the ad.

At 445, the process 430 transmits feedback corresponding to the detected affirmative user action to a server system (comprised, e.g., of an analytics engine, a replacement logic engine and a content item server) at which, for example, content replacement decisions (e.g., whether to replace and, if so, with what it should be replace) may be made. At 450, the process 430 receives from the server system one or more replacement content items that were selected based at least in part on the transmitted feedback. Lastly, at 455 the process 430 updates the displayed presentation page (e.g., without affecting other content on the page) to replace one or more of the displayed content items with the received one or more replacement content items.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Figure 5:
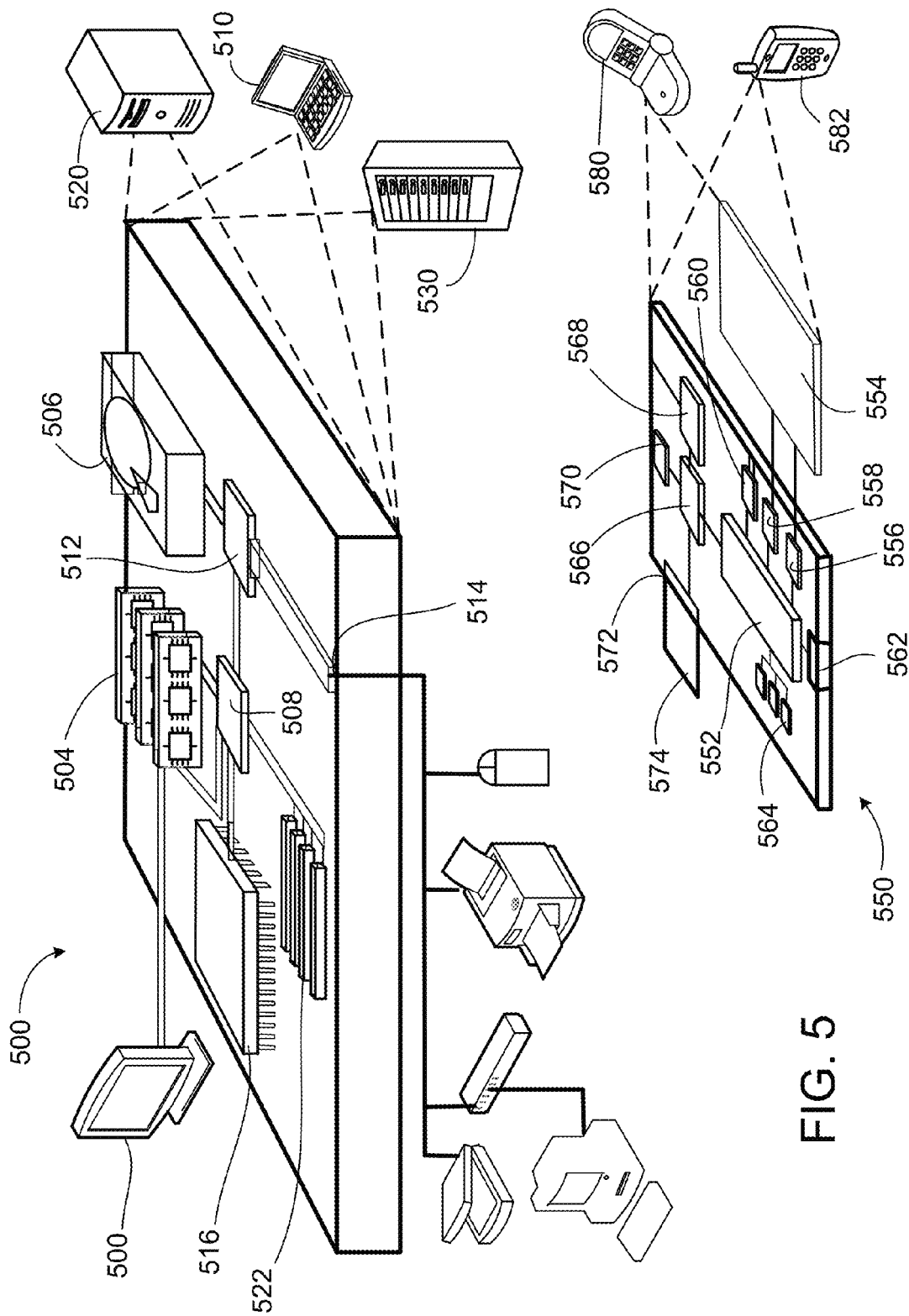
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for detecting impersonation on a social network may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method performed by data processing apparatus, the method comprising:
   receiving, from a client device, an indication that a user performed an affirmative act on a presentation page comprising a plurality of content spaces that have a plurality of content items, wherein each content item of the plurality of content items is displayed in a particular content space of the plurality of content spaces;
   determining a measure of interest of the user specific to a particular content item of the plurality of content items based on the received indication including the affirmative act on the presentation page;
   determining, during presentation of the particular content item, to replace the particular content item based on the measure of interest and a threshold;
   identifying a category with which content displayed for the particular content item is associated;
   during a same presentation of the presentation page and within a specified duration of time after the particular content item is presented, selecting a replacement content item from a plurality of replacement content items that are associated with a different category than the identified category, wherein selecting the replacement content item comprises applying a plurality of pre-defined replacement content selection rules for identifying the replacement content item based on affirmative acts, wherein the pre-defined replacement content selection rules accord a higher weight to one type of the affirmative acts, relative to a weight accorded to another of the affirmative acts, with selecting being in response to determining that the threshold has been exceeded; and
   transmitting the selected replacement content item to the client device for display in the particular content space on the presentation page in place of the particular content item.

2. The method of claim 1 wherein the presentation page comprises a dynamic webpage and at least one of the plurality of content items comprises an independently replaceable advertisement.

3. The method of claim 1 wherein the affirmative act performed by the user comprises an action from which disinterest in one or more content items can reasonably be inferred.

4. The method of claim 1 wherein determining a measure of interest of the user comprises inferring whether the user is likely to perform an action indicating interest in one or more content items.

5. The method of claim 4 wherein inferring whether the user is likely to perform an action indicating interest in one or more content items comprises determining whether the user is likely to click on a link associated with a content item.

6. The method of claim 1 wherein determining a measure of interest of the user is performed by a logic engine applying the plurality of pre-defined replacement content selection rules.

7. The method of claim 6 wherein one or more of the pre-defined replacement content selection rules are based on factors including one or more of a nature of the affirmative act performed by the user, a duration of time spent on the presentation page by the user, demographics of the user, browsing history of the user, a type of the client device, a geographic location of the client device, and one or more other external factors.

8. The method of claim 6 wherein the pre-defined replacement content selection rules are defined by one or more of a publisher of the presentation page, a content sponsor of at least one content item, and the user.

9. The method of claim 1 wherein one or more of the pre-defined replacement content selection rules are based on factors including one or more of a nature of the affirmative act performed by the user, a duration of time spent on the presentation page by the user, demographics of the user, browsing history of the user, a type of the client device, a geographic location of the client device, and one or more other external factors.

10. The method of claim 1 wherein receiving an indication that a user performed an affirmative act is in real time relative to the affirmative act.

11. The method of claim 1 further comprising receiving, from a content sponsor, content selection criteria that includes the plurality of pre-defined replacement content selection rules.

12. A method performed by data processing apparatus, the method comprising:
displaying to a user a presentation page comprising a plurality of content items in a plurality of content spaces, wherein each content item of the plurality of content items is displayed in a particular content space of the plurality of content spaces;
detecting an indication of an affirmative act performed by the user on the presentation page from which an inference can be made relating to a particular content item of the plurality of content items;
transmitting the indication of the affirmative act performed by the user to a server system;
receiving from the server system a replacement content item that was selected based on (i) the transmitted indication, (ii) subject matter of the particular content item, and (iii) applying a plurality of pre-defined replacement content selection rules for identifying the replacement content item based on affirmative acts, wherein the pre-defined replacement content selection rules accord a higher weight to one type of the affirmative acts, relative to a weight accorded to another of the affirmative acts, wherein the replacement content item is received during a same presentation of the presentation page and within a specified duration of time after the particular content item is presented, wherein the replacement content item is associated with a different category than a category with which content displayed for the particular content item is associated; and
updating the displayed presentation page to replace the particular content item with the received replacement content item.

13. The method of claim 12 wherein the affirmative act performed by the user comprises causing a focus point on a client device displaying the presentation page to pass over a content item without also performing an action indicating interest in the content item.

14. The method of claim 13 wherein the focus point comprises a cursor displayed on the client device, the content item comprises a clickable link, and the action indicating interest comprises clicking on the clickable link.

15. The method of claim 13 wherein the focus point comprises a detected eye-point of the user on the client device display.

16. The method of claim 12 wherein the affirmative act performed by the user comprises changing a display configuration of the presentation page to cause one or more content items to be relocated to a position of lesser prominence in the presentation page.

17. The method of claim 16 wherein the affirmative act performed by the user comprises changing the display configuration of the presentation page to cause one or more content items to be obscured in whole or in part.

18. The method of claim 16 wherein changing the display configuration comprises one or both of resizing the presentation page and scrolling the presentation page.

19. The method of claim 12 wherein transmitting the indication of an affirmative act is facilitated in real time via a cookie residing at a client device.

20. The method of claim 12 wherein updating the displayed presentation page is performed without refreshing portions of the presentation page that remain unchanged.

21. The method of claim 12 wherein updating the displayed presentation page comprises independently replacing the particular content item without affecting other portions of the presentation page.

22. The method of claim 12 wherein the affirmative act performed by the user comprises one or more of performing a search, interacting with the content item on the presentation page, and providing alphanumeric input.

23. A non-transitory computer storage medium encoded with a computer program, the program comprising instructions that when executed by data processing apparatus cause the data processing apparatus to perform operations comprising:
displaying to a user a presentation page comprising a plurality of content items in a plurality of content spaces, wherein each content item of the plurality of content items is displayed in a particular content space of the plurality of content spaces;
detecting an indication of an affirmative act performed by the user on the presentation page from which an inference can be made relating to a particular content item of the plurality of content items;
transmitting the indication of the affirmative act performed by the user to a server system;
receiving from the server system a replacement content item that was selected based on (i) the transmitted indication, (ii) subject matter of the particular content item, and (iii) applying a plurality of pre-defined replacement content selection rules for identifying the replacement content item based on affirmative acts, wherein the pre-defined replacement content selection rules accord a higher weight to one type of the affirmative acts, relative to a weight accorded to another of the affirmative acts, wherein the replacement content item is received during a same presentation of the presentation page and within a specified duration of time after the particular content item is presented, wherein the replacement content item is associated with a different category than a category with which content displayed for the particular content item is associated; and updating the displayed presentation page to replace the particular content item with the received replacement content item.

24. The medium of claim 23 wherein the affirmative act performed by the user comprises causing a focus point on a client device displaying the presentation page to pass over a content item without also performing an action indicating interest in the content item.

25. The medium of claim 24 wherein the focus point comprises a cursor displayed on the client device, the content item comprises a clickable link, and the action indicating interest comprises clicking on the clickable link.

26. The medium of claim 23 wherein the affirmative act performed by the user comprises changing a display configuration of the presentation page to cause one or more content items to be relocated to a position of lesser prominence in the presentation page.

27. The medium of claim 26 wherein the affirmative act performed by the user comprises changing the display configuration of the presentation page to cause one or more content items to be obscured in whole or in part.

28. The medium of claim 26 wherein changing the display configuration comprising one or both of resizing the presentation page and scrolling the presentation page.

29. The medium of claim 23 wherein updating the displayed presentation page comprises independently replacing the particular content item without affecting other portions of the presentation page.

30. The medium of claim 23 wherein the affirmative act performed by the user comprises one or more of performing a search, interacting with a content item on the presentation page, and providing alphanumeric input.

31. A system comprising:
 a processor configured to execute computer program instructions; and
 a computer storage medium encoded with computer program instructions that, when executed by the processor, cause the system to perform operations comprising:
  displaying to a user a presentation page comprising a plurality of content items in a plurality of content spaces, wherein each content item of the plurality of content items is displayed in a particular content space of the plurality of content spaces;
  detecting an indication of an affirmative act performed by the user on the presentation page from which an inference can be made relating to a particular content item of the plurality of content items;
  transmitting the indication of the affirmative act performed by the user to a server system;
  receiving from the server system a replacement content item that was selected based on (i) the transmitted indication, (ii) subject matter of the particular content item, and (iii) applying a plurality of pre-defined replacement content selection rules for identifying the replacement content item based on affirmative acts, wherein the pre-defined replacement content selection rules accord a higher weight to one type of the affirmative acts, relative to a weight accorded to another of the affirmative acts, wherein the replacement content item is received during a same presentation of the presentation page and within a specified duration of time after the particular content item is presented, wherein the replacement content item is associated with a different category than a category with which content displayed for the particular content item is associated; and
  updating the displayed presentation page to replace the particular content item with the received replacement content item.

32. The system of claim 31 wherein the affirmative act performed by the user comprises causing a focus point on a client device displaying the presentation page to pass over a content item without also performing an action indicating interest in the content item.

33. The system of claim 32 wherein the focus point comprises a cursor displayed on the client device, the content item comprises a clickable link, and the action indicating interest comprises clicking on the clickable link.

34. The system of claim 31 wherein the affirmative act performed by the user comprises changing a display configuration of the presentation page to cause one or more content items to be relocated to a position of lesser prominence in the presentation page.

35. The system of claim 34 wherein the affirmative act performed by the user comprises changing the display configuration of the presentation page to cause one or more content items to be obscured in whole or in part.

36. The system of claim 34 wherein changing the display configuration comprising one or both of resizing the presentation page and scrolling the presentation page.

37. The system of claim 31 wherein updating the displayed presentation page comprises independently replacing the particular content item without affecting other portions of the presentation page.

38. The system of claim 31 wherein the affirmative act performed by the user comprises one or more of performing a search, interacting with a content item on the presentation page, and providing alphanumeric input.

* * * * *

UNITED STATES PATENT AND TRADEMARK OFFICE
CERTIFICATE OF CORRECTION

PATENT NO.         : 9,594,732 B2                                        Page 1 of 1
APPLICATION NO.    : 13/722829
DATED              : March 14, 2017
INVENTOR(S)        : Compain et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 537 days.

Signed and Sealed this
Twenty-fifth Day of September, 2018

Andrei Iancu
*Director of the United States Patent and Trademark Office*